(12) United States Patent
Kobayashi et al.

(10) Patent No.: US 8,365,757 B2
(45) Date of Patent: Feb. 5, 2013

(54) VALVE DEVICE FOR FUEL TANK

(75) Inventors: Yasutomo Kobayashi, Yamato (JP); Takeshi Kojima, Machida (JP)

(73) Assignee: NIFCO Inc., Yokohama-shi (JP)

( * ) Notice: Subject to any disclaimer, the term of this patent is extended or adjusted under 35 U.S.C. 154(b) by 402 days.

(21) Appl. No.: 12/451,054

(22) PCT Filed: Apr. 25, 2008

(86) PCT No.: PCT/JP2008/058076
§ 371 (c)(1),
(2), (4) Date: Dec. 3, 2009

(87) PCT Pub. No.: WO2008/136412
PCT Pub. Date: Nov. 13, 2008

(65) Prior Publication Data
US 2010/0089466 A1     Apr. 15, 2010

(30) Foreign Application Priority Data
Apr. 26, 2007 (JP) ................................ 2007-117512

(51) Int. Cl.
*F16K 24/04* (2006.01)
(52) U.S. Cl. .......................................... 137/202; 137/43
(58) Field of Classification Search ............... 137/39, 137/43, 202, 587; 141/198
See application file for complete search history.

(56) References Cited

U.S. PATENT DOCUMENTS

| | | | |
|---|---|---|---|
| 4,753,262 A | 6/1988 | Bergsma | |
| 5,497,800 A * | 3/1996 | Ohashi et al. | 137/587 |
| 5,755,252 A * | 5/1998 | Bergsma et al. | 137/202 |
| 5,944,044 A * | 8/1999 | King et al. | 137/202 |
| 5,960,816 A * | 10/1999 | Mills et al. | 137/202 |
| 5,996,607 A * | 12/1999 | Bergsma et al. | 137/202 |
| 6,085,771 A * | 7/2000 | Benjey et al. | 137/202 |
| 6,240,950 B1 * | 6/2001 | Harris | 137/202 |
| 6,405,747 B1 | 6/2002 | King et al. | |
| 6,564,822 B2 * | 5/2003 | Muto et al. | 137/202 |
| 6,901,943 B2 * | 6/2005 | Yamada et al. | 137/202 |
| 6,941,966 B2 * | 9/2005 | Mori et al. | 137/202 |
| 6,994,103 B2 * | 2/2006 | Takahashi et al. | 137/202 |
| 7,963,296 B2 * | 6/2011 | Kaneko | 137/202 |
| 2006/0108000 A1 | 5/2006 | Kaneko et al. | |
| 2007/0084510 A1 | 4/2007 | Kaneko et al. | |

FOREIGN PATENT DOCUMENTS

| | | |
|---|---|---|
| JP | H07-279789 | 10/1995 |
| JP | H08-225022 | 9/1996 |
| JP | 2006-09645 | 1/2006 |
| JP | 2006-97538 | 4/2006 |
| JP | 2006-234159 | 9/2006 |
| JP | 2006-321468 | 11/2006 |
| JP | 2007-016891 | 1/2007 |
| JP | 2007-092834 | 4/2007 |

* cited by examiner

*Primary Examiner* — Craig Schneider
*Assistant Examiner* — Craig J Price
(74) *Attorney, Agent, or Firm* — Manabu Kanesaka

(57) ABSTRACT

A valve body and a float body are combined by respectively coupling two or more coupling parts provided on one of the valve body and the float body to coupled parts provided on the other of the valve body and the flat body in a state allowing upward and downward movements of the valve body. During descent of the float body, one coupling part of the two or more coupling parts is caught on the coupled parts ahead of the other coupling parts whereby the valve body is tilted, and the other coupling parts restrict the tilting of the valve body.

16 Claims, 12 Drawing Sheets

VALVE DEVICE FOR FUEL TANK

TECHNOLOGICAL FIELD

This invention relates to a valve device, which is provided in an air passage connecting the inside and outside of a fuel tank, and is used for blocking the inflow of fuel beyond the valve device.

BACKGROUND TECHNOLOGY

Of surface level control valves in fuel tanks, there is one, as shown in FIG. 16, in which a valve member 101 is coupled to the upper part of a float 100 to be capable of relative movement, and it is made such that this valve member 101 is pushed upward by a protruding part 100a formed in the center of the upper part of this float 100, and this valve member 101 is made to contact with a seat part 103 provided inside an air exchange passage connecting to a canister, and it closes this air exchange passage in this state of contact (see Patent Document 1).

However, in such control valve, first, it functions such that the float 100 descends when the surface level drops from the closed state of the air exchange passage, and at this time, the edge part of the head part on the upper part of the float 100 catches on a protrusion 101a of the valve member 101 and moves the valve member 101 away from the seat part, but when a force is applied to the valve member 101 so as to stick to the seat part 103, such as when the inside of the fuel tank is under high pressure, it is difficult to pull the valve member 101 immediately from the seat part 103 by the descent of the float 100, and it is difficult to release the closure of the air exchange valve with good response when the surface level goes down.

Also, second, the valve member 101 is supported by said protruding part 00a, but when the valve member 101 is tilting during ascent of the float 100, it comes to contact first with the seat part 103 on the upward side of the tilt of the valve member 101. Also, in this case, the downward side of the tilt of this valve member 101 is finally lifted up and the posture of the valve member 101 is corrected, but because this correction is accomplished by making the edge part 100b of the head part on the upper part of the float 100 and the inner surface of said protrusion 101a contact on the downward side of the tilt of the valve member 101 away from the center of the float 100 (FIG. 16), when done thus, the force necessary to make the valve member 101 contact completely with the seat part 103 is made excessively great.

Patent Document 1: Publication of Japanese Unexamined Patent H7-279789

DISCLOSURE OF THE INVENTION

Problems the Invention Attempts to Solve

The main problem that this invention attempts to solve is that, in a valve device (valve) using this kind of float body, when the surface level of the fuel inside the fuel tank drops to a prescribed height, it can move to the open state and release the closed state of the air passage with good response.

Also, second, when the float body ascends when the valve body coupled to the float body in a state allowing upward and downward movement is in a tilted state, the tilt of this float body is corrected and the valve body is seated in the valve seat with the minimum necessary upward force.

Means for Solving the Problems

The first problem is solved by constituting the valve device for fuel tank as (1)-(7) below.

(1) In a valve device provided in an air passage connecting the inside and outside of a fuel tank,
(2) it comprises a float body having a valve body on its upper part,
(3) a receiving chamber forming a part of said air passage, which receives this float body to be capable of upward and downward movements, and
(4) a valve seat forming a part of said air passage, which is closed on seating of said valve body by ascent of the float body due to inflow of fuel into this receiving chamber;
(5) wherein the valve body and the float body are combined by respectively coupling two or more coupling parts provided on one of these to parts coupled with provided on the other of these in a state allowing upward and downward movement of the valve body, and
(6) during descent of the float body, one coupling part of the two or more coupling parts is caught on the part coupled with ahead of the other coupling parts whereby the valve body is tilted,
(7) and moreover it is made such that the other coupling parts restrict the tilting of this valve body.

Also, the first problem is solved by constituting the valve device for fuel tank as (1)-(7) below.
(1) In a valve device provided in an air passage connecting the inside and outside of a fuel tank,
(2) it comprises a float body having a valve body on its upper part,
(3) a receiving chamber forming a part of said air passage, which receives this float body to be capable of upward and downward movements, and
(4) a valve seat forming a part of said air passage, which is closed on seating of said valve body by ascent of the float body due to inflow of fuel into this receiving chamber;
(5) wherein the valve body and the float body are combined by respectively coupling two or more coupling parts provided on one of these to parts coupled with provided on the other of these in a state allowing upward and downward movements of the valve body, and
(6) a coupling part is not provided in a position opposite the position where at least one coupling part of these coupling parts is provided on either side of the central axis of movement of the float body.

In the descended position of the float body, the valve body is supported on the float body. When fuel flows into the receiving chamber forming a part of the air passage, the float body and the valve body ascend together and close the valve seat (valve closed). When the fuel flows out from the receiving chamber from this state, because the valve body and the float body are combined in coupling in a state allowing upward and downward movements of the valve body, when the float body descends the valve body supported on this also descends and the valve seat is opened. When the float body descends to the position where one coupling part catches on the part coupled with, the valve body is tilted with the side of this one coupling part downward, and the valve body can be pulled greatly away from the valve seat on this side in the initial stage of descent of the float body. By this, the valve seat can be opened with good response and the fuel tank can be put in a state capable of venting to the outside at the same time as the fuel flows out from the receiving chamber. Also, when the inside of the fuel tank is under high pressure, a condition in which the valve body is pushed against the valve seat and it is difficult to unseat may arise, but even in such case the valve body is tilted by the descent of the float body and the valve seat can be opened smoothly.

Also, the second problem is solved by further constituting the valve device for fuel tank as (1)-(2) below.

(1) It has a pair of guide means, on the side of the central axis of movement of the float body, which when a tilt occurs in the valve body, contacts on the downward side of the tilt of this valve body and corrects this tilt by ascent of the float body, and (2) it is made such that the float body and the valve body do not contact each other in the rest of the places during ascent of the float body.

When the float body ascends by inflow of fuel into the receiving chamber, the valve body also ascends, but when a tilt occurs in the valve body at this time, because the valve body contacts first on one side of the valve seat, the other side of the valve seat is lifted up by the float body with this side as a fulcrum, and the tilt of the float body is corrected, and it becomes that the valve body is fully seated in the valve seat. Because said guide means are provided on the side of the central axis of movement of the float body, when a tilt as said occurs in the valve body, said tilt can be corrected by making the valve body and the float body contact at a position near said fulcrum without increasing the frictional force.

Effect of the Invention

According to the valve device pertaining to this invention, when the surface level of the fuel inside the fuel tank drops to a prescribed height, it can move to the open state and release the closed state of the air passage with good response.

Also, by further providing the guide means, when the float body ascends when the valve body is in a tilted state, the tilt of this float body can be corrected and this valve body can be seated in the valve seat with the minimum necessary upward force.

BEST MODES IN PRACTICE OF THE INVENTION

Preferred modes of working of this invention are explained below based on FIG. 1-FIG. 15.

Figure 8:
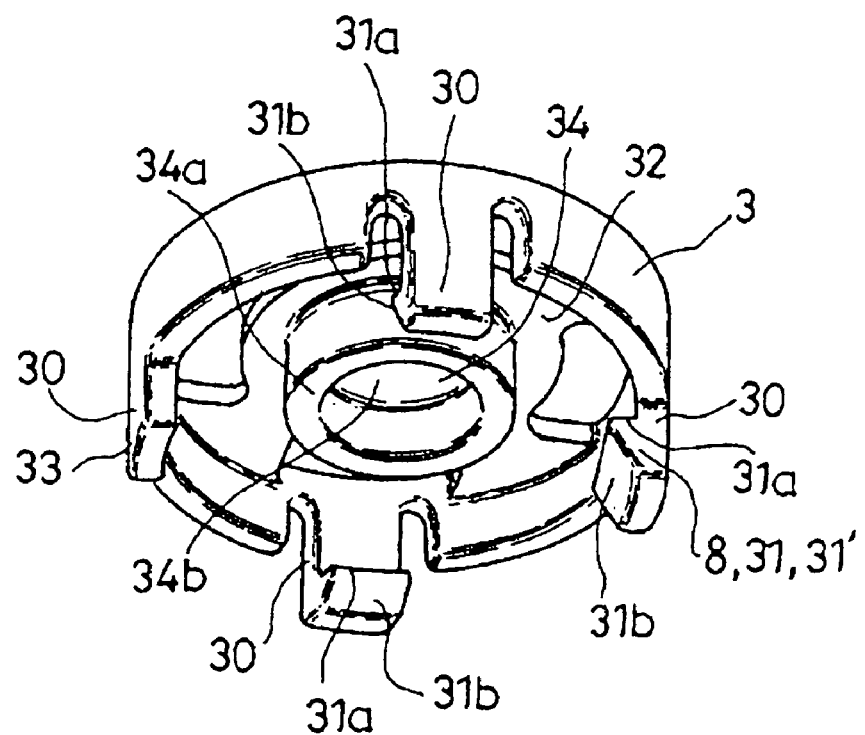
FIG. 8 is a perspective view of the valve body.
Figure 9:
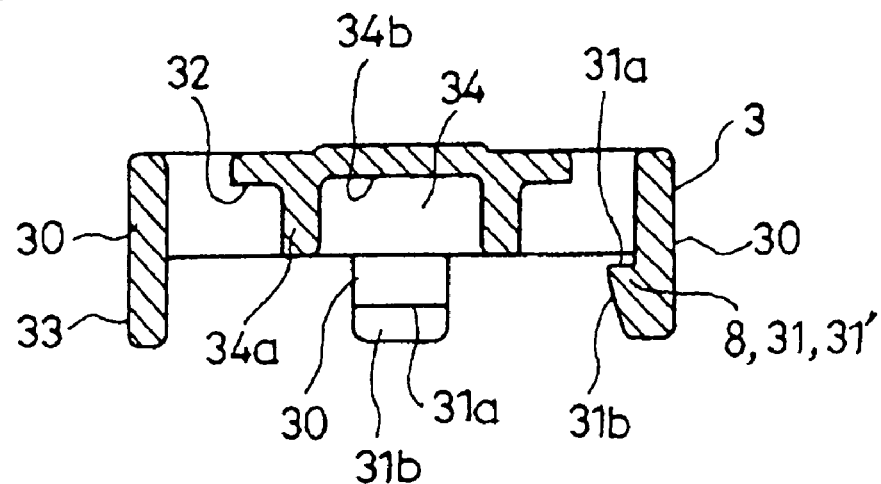
FIG. 9 is a sectional view of the same.
Figure 10:
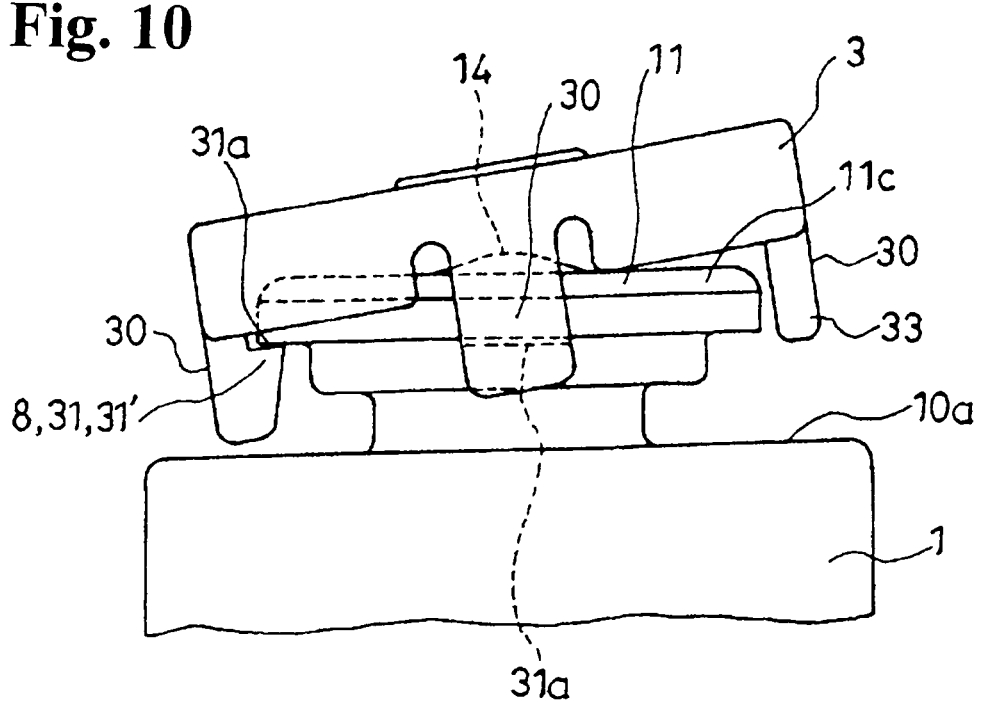
FIG. 10 is a side view showing the tilted state of the valve body pertaining to another configuration example.
Figure 11:
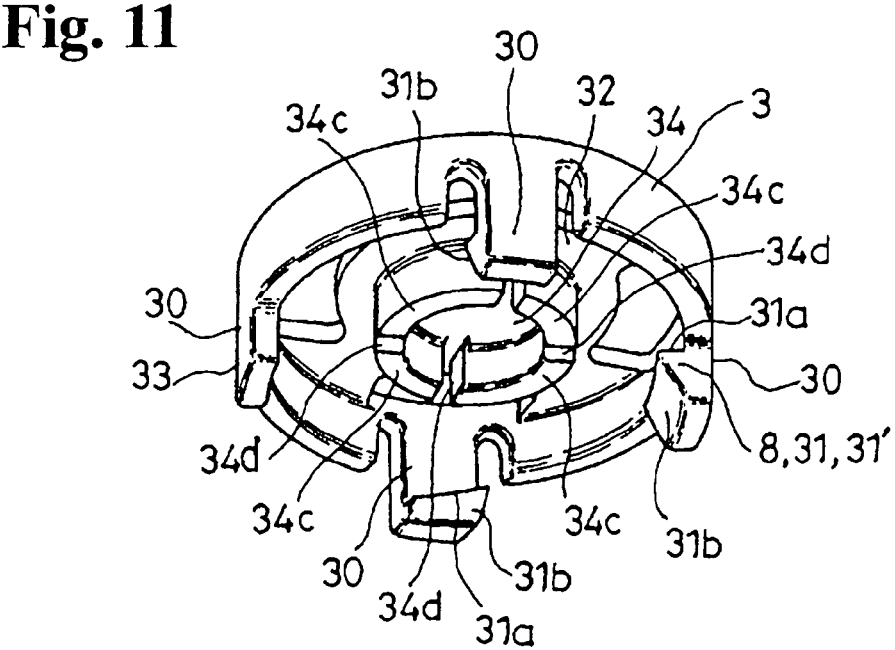
FIG. 11 is a perspective view of the same valve body.
Figure 12:
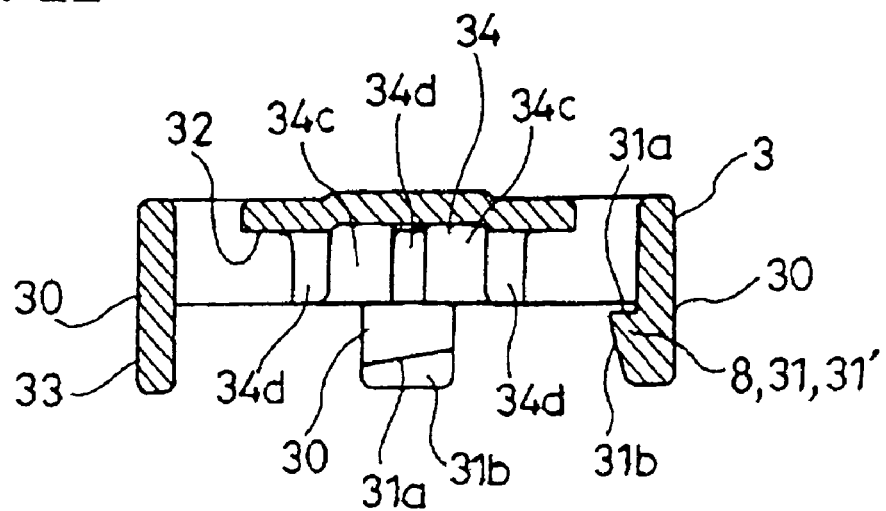
FIG. 12 is a sectional view of the same.

Here, FIG. 1-FIG. 9 show a configuration example of the valve device pertaining to a mode of working, FIG. 10-12 show an example partially changing the configuration of the valve body in the configuration example shown in FIG. 1-9, FIG. 13 shows an example partially changing the configuration of the float body 1 in the configuration example shown in FIG. 1-9, FIG. 14 shows another example changing the configuration of the float body 1 in the configuration example shown in FIGS. 1-9, and FIG. 15 shows an example partially changing the configurations of both the valve body 3 and the float body 1 in the configuration example shown in FIG. 1-FIG. 9.

Figure 1:
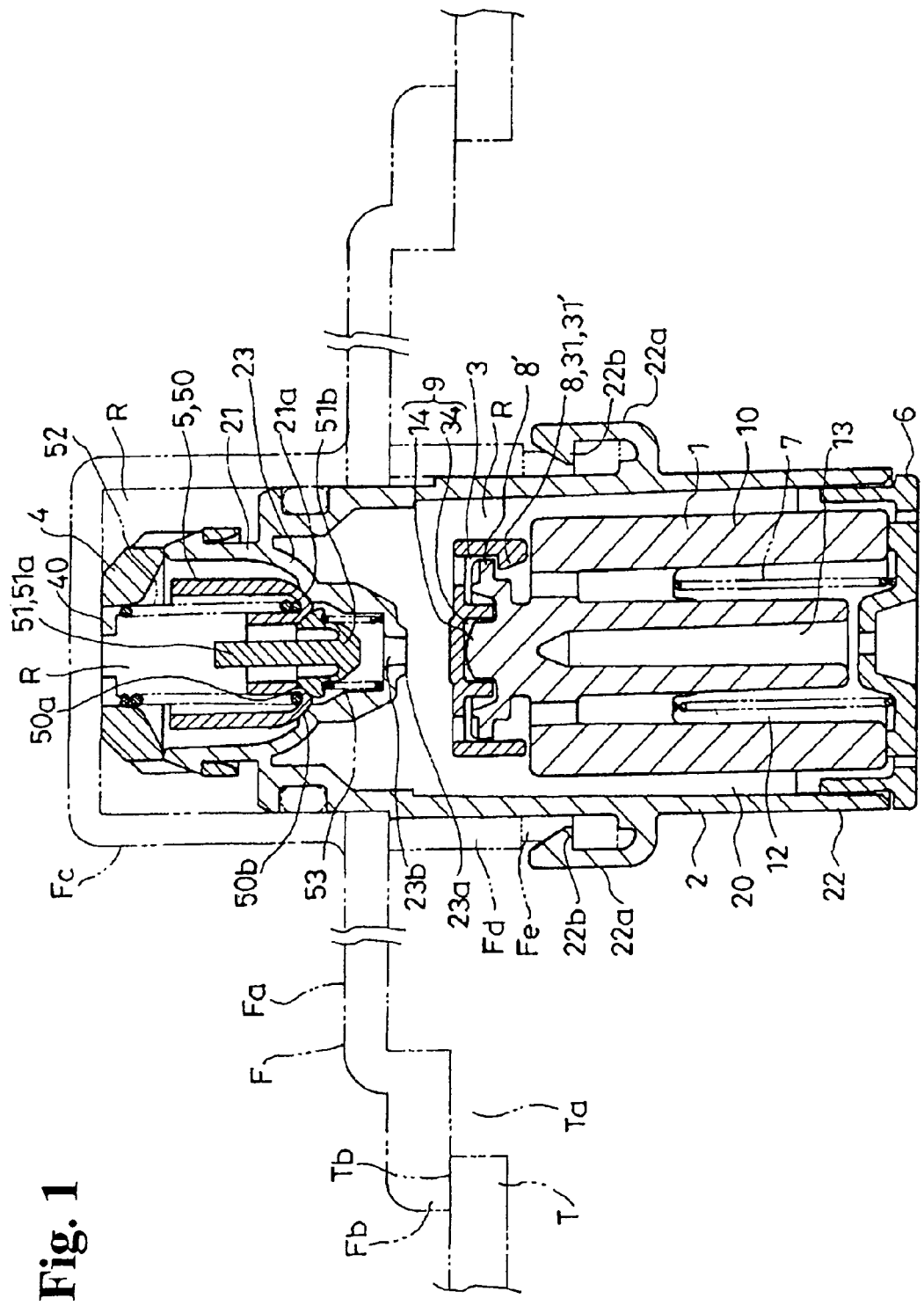
FIG. 1 is a sectional structural drawing showing the condition of use of the valve device.
Figure 2:
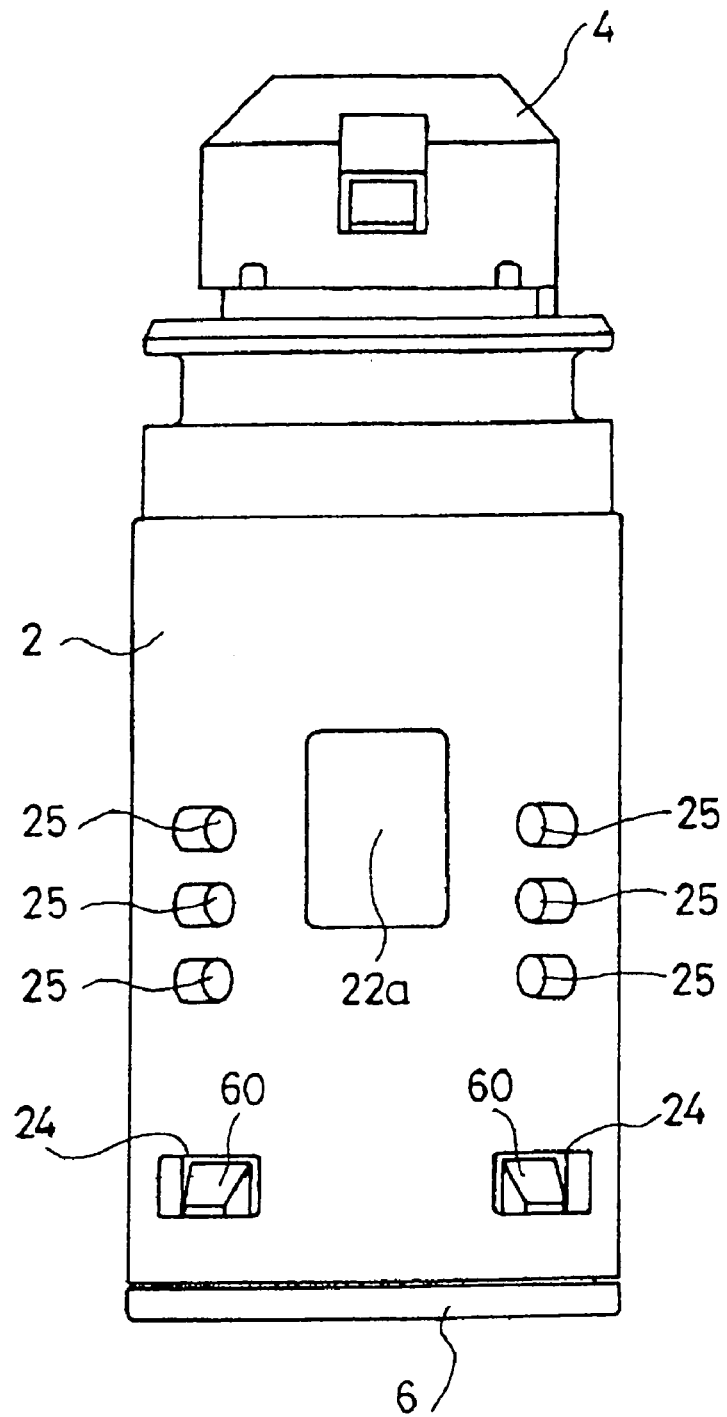
FIG. 2 is a side view of the valve device.
Figure 3:
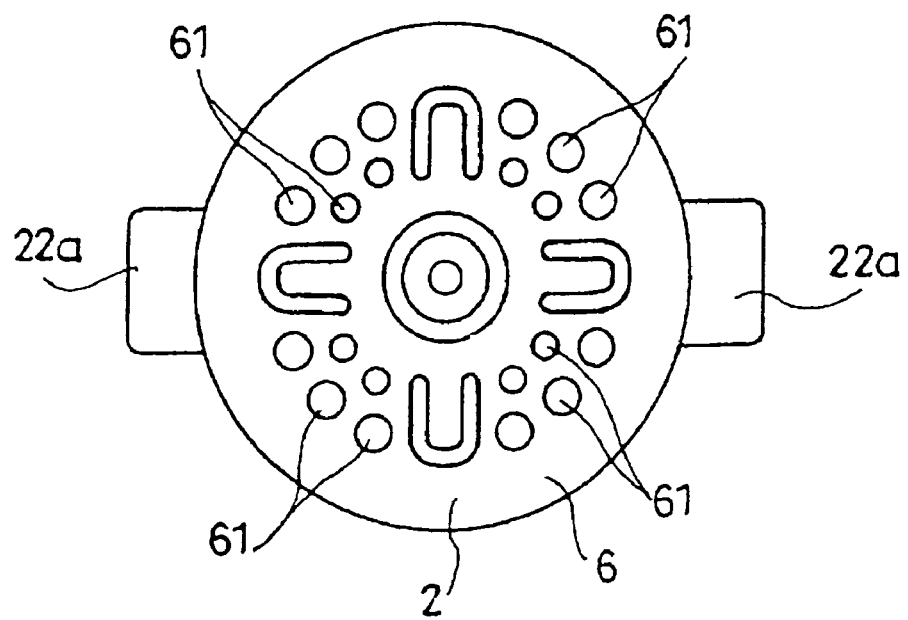
FIG. 3 is a bottom view of the same.
Figure 4:
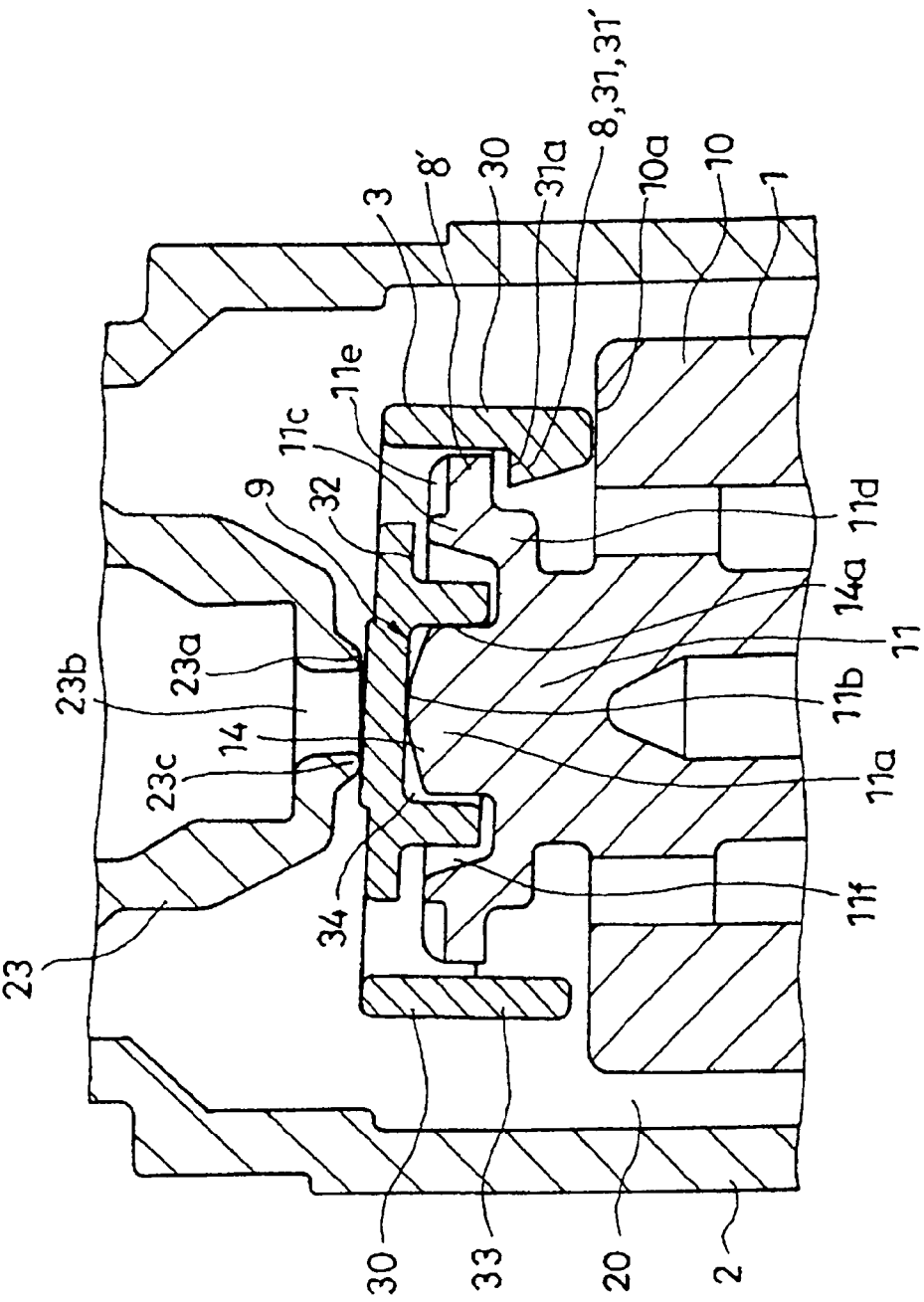
FIG. 4 is a sectional structural drawing of the essential parts of the valve device (check valve omitted).
Figure 5:
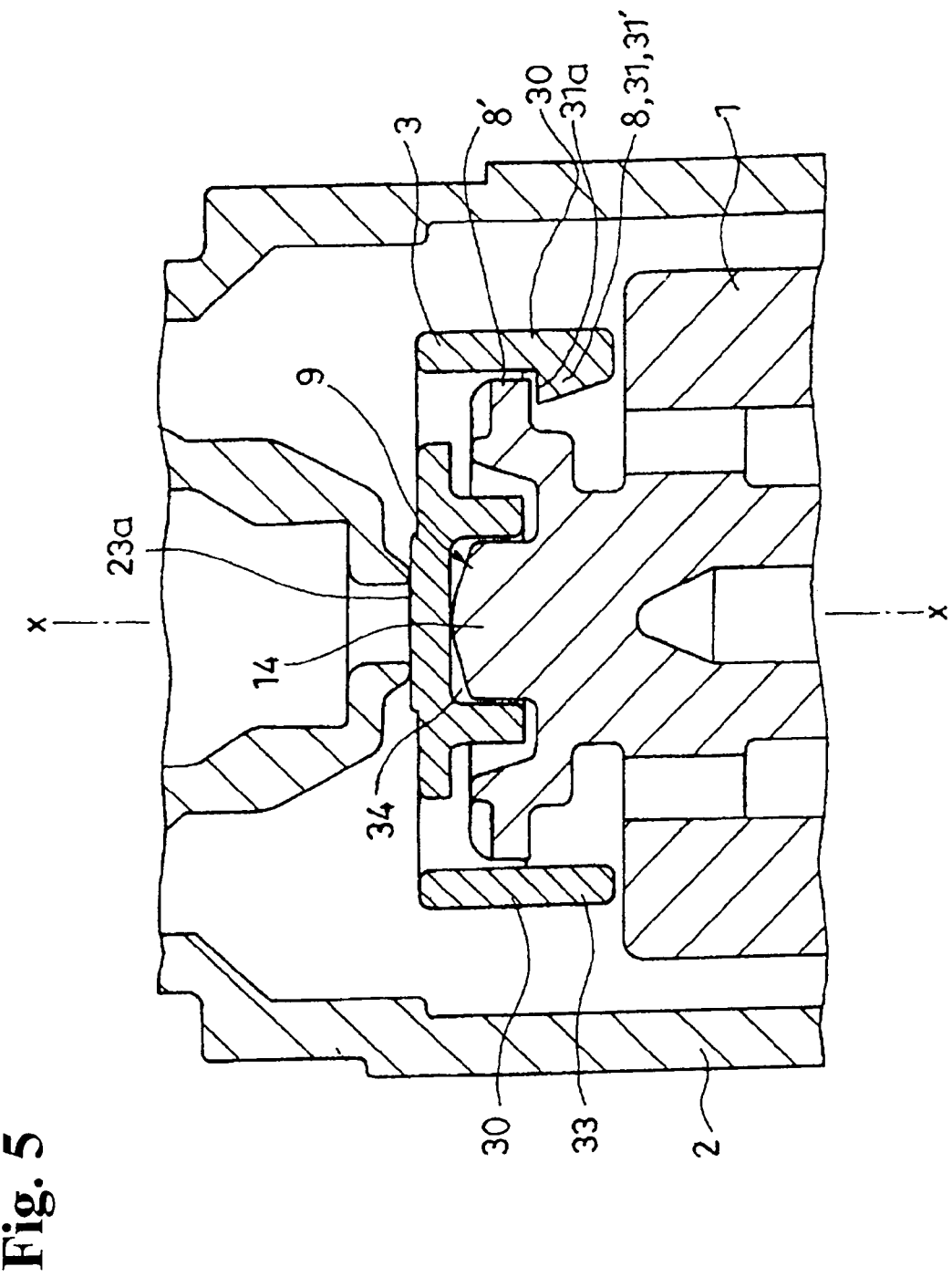
FIG. 5 is a sectional structural drawing of the essential parts of the valve device (check valve omitted).
Figure 6:
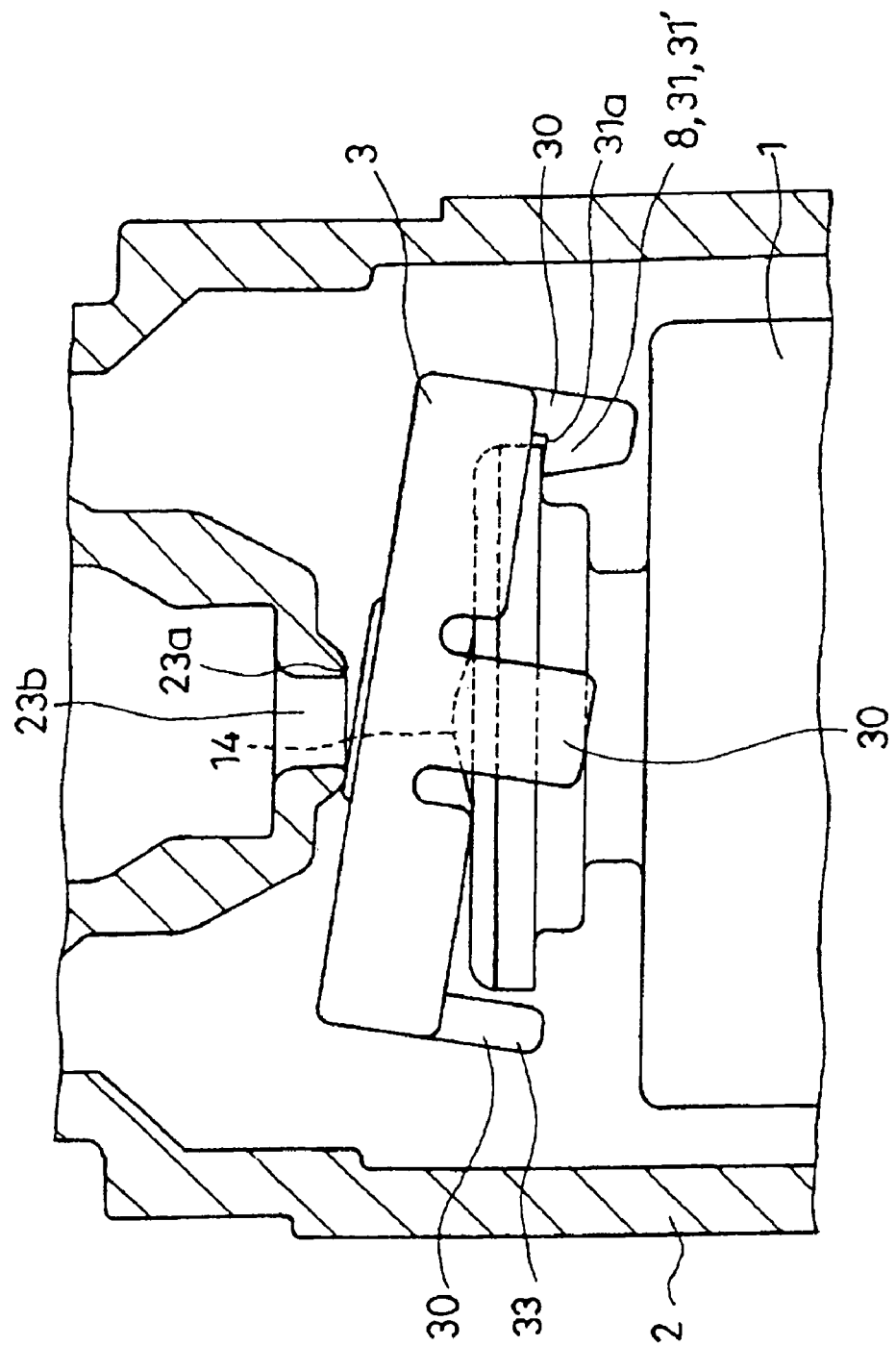
FIG. 6 is a sectional structural drawing of the essential parts of the valve device (check valve omitted).
Figure 7:
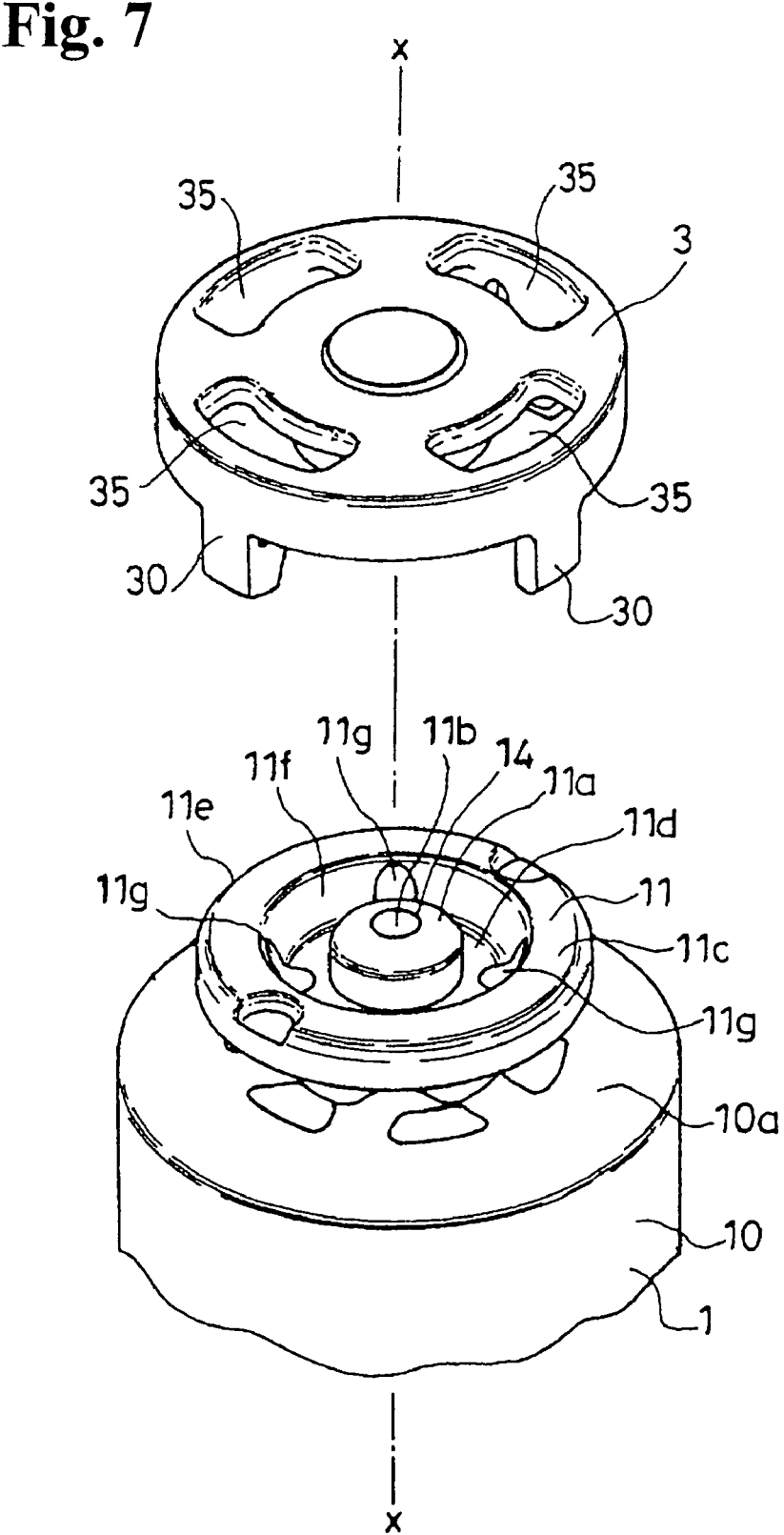
FIG. 7 is a decomposed perspective view of the valve body and the float body.

Regarding FIG. 1-FIG. 9, FIG. 1 shows in section the overall configuration of the valve device when the float body 1 is in the descended position, FIG. 2 shows the valve device from the side view, and FIG. 3 shows it from the bottom view. FIG. 4 shows the state in which the float body 1 ascended when the valve body 3 was tilted and the upward side of the tilt of this valve body 3 contacted the valve seat 23a, FIG. 5 shows the state in which the posture of the valve body 3 was corrected and the valve seat 23a was closed by upward force applied to the float body 1 following the state in FIG. 4, and FIG. 6 shows the state immediately after the float body 1 descended whereby the valve body 3 was tilted and the valve seat 23a was opened following the state in FIG. 5. Also, FIG. 7 shows the condition having disassembled the valve body 3 and the float body 1, and FIG. 8 and FIG. 9 show such valve body 3.

Figure 13:
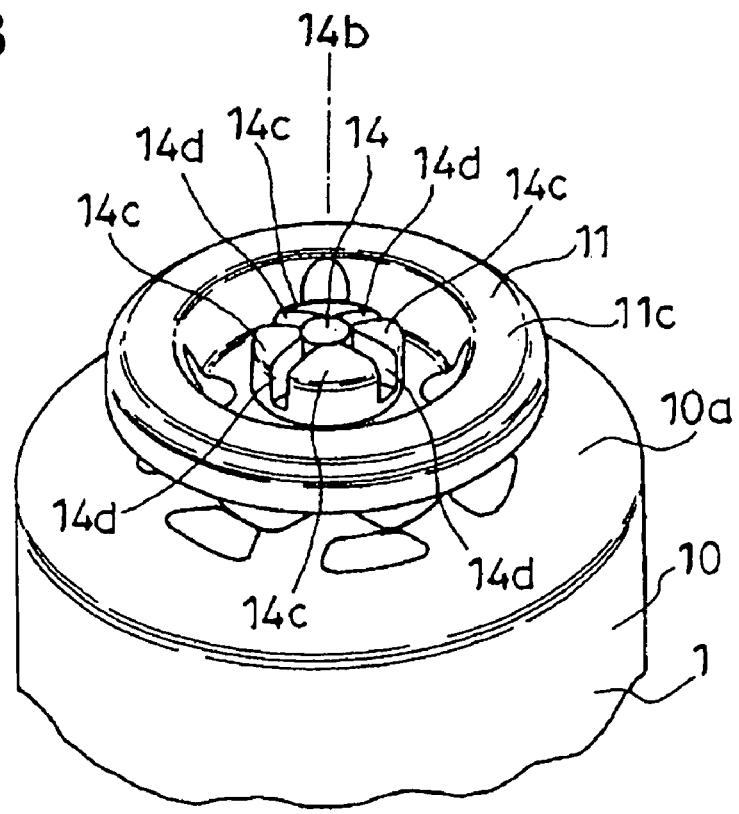
FIG. 13 is a perspective view of the essential parts of the float body pertaining to another configuration example.

Also, regarding FIG. 10-FIG. 12, FIG. 10 shows the manner immediately after the float body 1 having seated the valve body 3 in the valve seat 23a began to descend, representing only this float body 1 and valve body 3, and FIG. 11 and FIG. 13 represent such valve body 3.

The valve device for fuel tank pertaining to this mode of working is provided inside an air passage R connecting the inside and outside of a fuel tank T, and basically it is used for blocking the inflow of fuel into the air passage R beyond the valve device in such cases as when the surface level of the fuel inside the fuel tank T rises to a prescribed height due to filling of fuel or tilting of the vehicle, or the like.

Typically, it is made such that such valve device is normally in the open state, and it moves to the closed state in a condition in which fuel is let into the air passage R beyond the valve device due to filling of fuel or tilting of the vehicle, or the like, and it moves again to the open state when this condition disappears. By this, it is made such that such valve device can be used as a vent valve for restricting the upper limit of filling of fuel into the fuel tank T or a cut valve provided inside the air passage R for keeping the pressure inside the fuel tank T within a prescribed range. Such air passage R typically connects the fuel tank T with a canister.

Such valve device comprises a float body 1, a receiving chamber 20, and a valve seat 23a.

In the illustrated example, the valve seat 23a is formed on a partition 23 of a cylindrical case 2 having an upper cylinder part 21 and a lower cylinder part 22 wider than this and dividing this upper cylinder part 21 and lower cylinder part 22 by this partition 23. In the illustrated example, the partition 23 assumes a dome shape protruding downward with the inside of the dome as a part of the inner wall of the upper cylinder part 21 and the outside of the dome as a part of the inner wall of the lower cylinder part 22. The valve seat 23a is constituted by providing a perforation 23b to serve as a part of the air passage R in the center of the lower part of this partition 23. The perforation 23b is bordered by an encircling rib 23c on the outside of the dome on the partition 23. An upper cap 4 is attached on the upper end of the upper cylinder part 21.

Also, in this example, a check valve 5 is received inside such upper cylinder part 21.

Such check valve 5 is constituted by:

a first valve body 50 having a cylindrical shape, a second valve body 51 having a leg part 51a inserted inside this first valve body 50 from a lower end opening 50a on this first valve body 50 and having a head part 51b positioned beneath this lower end opening 50a, an upper compression spring 52 as an impelling means, which is interposed between the upper cap 4 and the inside part of the lower end of the first valve body 50, and with a prescribed force pushes an encircling shoulder part 50b going around the lower end opening 50a of this first valve body 50 in an airtight state against an encircling step surface 21a facing upward of the upper cylinder part 21 at a position upward from said valve seat 23a, and a lower compression spring 53 as an impelling means, which is interposed between the partition 23 and the head part 51b of the second valve body 51, and with a prescribed force pushes the head part 51b of this second valve body 51 in an airtight state against the lower end opening 50a of the second valve body 50.

Also, the lower end of the lower cylinder part 22 of the cylindrical case 2 is closed by a lower cap 6 which is assembled by coupling a coupling claw 60 to a coupling window 24 on the cylindrical case 2. It is made such that the float body 1 is received to be capable of upward and downward movement inside the lower cylinder part 22 of the cylindrical case 2 closed by the lower cap 6. That is, in the illustrated example, it is made such that the lower cylinder part 22 of such cylindrical case 2 functions as a receiving chamber 20 as one part of said air passage R for receiving the float body 1 to be capable of upward and downward movements. A perforation 40 is formed in the center of the upper cap 4, and plural perforations 61, 61 . . . are formed on the lower cap 6. In the illustrated example, plural perforations 25, 25 . . . are formed also on the side part of the cylindrical case 2.

Also, in the illustrated example, attachment arms 22a are provided at a position at about midway in the vertical direction of the lower cylinder part 22 of the cylindrical case 2, respectively on two sides in the diameter direction, each extending upward in a manner so as to open a gap between it and the outer surface of the lower cylinder part 22 and having a coupling claw 22b on the inside of the upper end part. In the illustrated example, it is made such that attachment of the valve device to the fuel tank T is accomplished by means of a flange body F having in the center of a disk-like part Fa an upper part Fc which protrudes from the upper surface of this disk-like part Fa and a lower part Fd which protrudes from the lower surface of this disk-like part Fa and having the lower end of this lower part Fd open. That is, a coupling window Fe for the coupling claw 22b of said attachment arm 22a is formed on the lower end of the lower part Fd of the flange body F, and it is made such that such coupling claw 22b enters into the coupling window Fe by recoil of the attachment arm 22a in the process of inserting the cylindrical case 2 from the lower part Fd of the flange body F up to the position where the upper cap 4 strikes the inner surface of the upper part Fc of the flange body F, whereby the flange body F and the valve device are combined. It is made such that the flange body F thus combined with the valve device is combined from above the outside of the fuel tank T so as to cover an attachment opening Ta provided on the fuel tank T, and the opening edge Tb of this attachment opening Ta and the outer edge Fb of the disk-like part Fa of the flange body F are fused, whereby the valve device is attached to such fuel tank T in a state having the lower cylinder part 22 of the cylindrical case 2, that is, the receiving chamber 20 having received the float body 1, positioned inside the fuel tank T, and having the upper cylinder part 21, that is, said check valve 5, positioned outside the fuel tank. The joining of the opening edge Tb of the attachment opening Ta and the outer edge Fb of the disk-like part Fa of the flange body F also may be accomplished by inserting a seal member between the two and fixing by screws.

The upper part Fc of the flange body F is connected to a canister not illustrated, and accordingly, the inside of the cylindrical case 2 constitutes a part of said air passage R. In the illustrated example, it is made such that when the inside of the fuel tank T is under high pressure which pushes the first valve body 50 upward in opposition to the impulsion of said upper compression spring 52, said encircling shoulder part 50b of this first valve body 50 moves away from said encircling step surface 21a and lets the air inside the fuel tank T escape to the outside of the fuel tank T, while on the other hand, when the inside of the fuel tank T is under low pressure which pushes the second valve body 51 downward in opposition to the impulsion of said lower compression spring 53, said head part of this second valve body 51 moves away from said lower end opening 50a of the first valve body 50 and introduces external air into the fuel tank T.

The float body 1 has the valve body 3 on its upper part. Also, it is made such that when an inflow of fuel into said receiving chamber 20 occurs, the float body 1 ascends, seating this valve body 3 in the valve seat 23a forming one part of said air passage R and closing the valve, and it closes this air passage R such that fuel does not enter into the air passage R beyond the valve seat 23a.

In the illustrated example, the float body 1 has a main body part 10 having a round columnar shape, and a head part 11 formed on the upper end of this main body part 10. The head part 11 has a shaft part 11a which projects outward following the central axis of movement x of the float body 1 from about the center of the upper end surface 10a of the main body part 10, and an encircling flange part 11c formed between the leading end 1ib and the base part of this shaft part 11a. The encircling flange part 11a furthermore has a center part 11d and an outer edge part 11e positioned upward from this center part 11d, and an encircling trough part 11f is formed between the two.

The float body 1 also has an encircling hole 12 having a circular hole opening surrounding the central axis of movement x on the lower end surface and continuing up to about midway in the vertical direction of the float body 1, and a center hole 13 opened on the lower end surface of the float body 1 positioned on the axial line of this central axis of movement x. In the illustrated example, it is made such that a fixed upward impelling force is applied in advance to the float body 1, being in the descended position having unseated the valve body 3 from the valve seat 23a and having the lower end in contact with the lower cap 6, by a compression coil spring 7 inserted in this encircling hole 12 and having the upper end of the spring in contact with the inner recessed part of this encircling hole 12 and having the lower end of the spring in contact with the lower cap 6 (FIG. 1).

In this mode of working, such valve body 3 and float body 1 are combined by respectively coupling two or more coupling parts 8 provided on one of these to parts coupled with 8' provided on the other of these in a state allowing upward and downward movements of the valve body 3, and it is made such that a coupling part 8 is not provided in a position opposite the position where at least one coupling part 8 of these coupling parts 8 is provided on either side of the central axis of movement x of the float body 1.

Also, it is made such that during descent of the float body 1, one coupling part 8 of the two or more coupling parts 8 is caught on the part coupled with 8' ahead of the other coupling parts 8 whereby the valve body 3 is tilted, and furthermore it is made such that the other coupling parts 8 restrict the tilting of this valve body 3.

In the illustrated example, the valve body 3 assumes a cylindrical shape, and it is constituted such that it ascends together with the ascent of the float body 1 and seats the center part of its upper surface in the encircling rib 23c of the valve seat 23a and closes this valve seat 23a. On the lower surface side of the valve body 3, there are provided plural leg parts 30 which project downward from its edge part. In the illustrated example, there are four leg parts 30 in total, one at each 90 degrees in the circumferential direction of the valve body 3. In the illustrated example, coupling claws 31 are formed on three of these leg parts 30, each having a coupling surface 31a facing upward on the inside of the leading end side of the leg part 30. Also, window 35 for shaping of the coupling claw 31 is provided on the valve body 3 in the position where the leg part 30 is formed. Also, the valve body 3 and the float body 1 are combined such that this coupling claw 31 is normally positioned in the space between said head part 11 and the upper end surface 10a of the main body part 10. Concretely, it is made such that each coupling claw 31 has an inclined surface 31b on the lower side, being inclined toward the direction of thinning the vertical dimension of the coupling claw 31 as it goes toward the side of the coupling surface 31a, and the leading end of each coupling claw 31 where this inclined surface 31b and the coupling surface 31a meet is positioned on an arc of an imaginary circle making the diameter somewhat smaller than the outer diameter of the head part 11. Also, in this example, it is made such that the head part 11 can be inserted between each leg part 30 while elastically deforming this leg part 30 by pushing the edge part of the head part 11 against said inclined surface 31a, and by elastic recoil of the leg part 30 at the position where the edge part of the head part 11 rides past the coupling claw 31, the valve body 3 and the float body 1 are combined such that this coupling claw 31 is normally positioned between the head part 11 and the upper end surface 10a of the main body part 10. That is, in the example shown in FIG. 1-FIG. 14, it is made such that the coupling claw 31 of such valve body 3 functions as said coupling part 8, and the head part 11 of the float body 1 functions as said part coupled with 8'.

In the descended position of the float body 1, the valve body 3 is supported on the head part 11 of the float body 1 (FIG. 1). When fuel flows into the receiving chamber 20 forming a part of the air passage R through said perforations 25, 61, and the like, the float body 1 and the valve body 3 ascend together and close the valve seat 23a (valve closed/ FIG. 5). When the fuel flows out from the receiving chamber 20 following this state, because the valve body 3 and the float body 1 are combined by coupling in a state allowing upward and downward movements of the valve body 3, when the float body 1 descends, the valve body 3 supported on this also descends and the valve seat 23a is opened. In the valve device pertaining to this mode of working, because a coupling part 8 is not provided in a position opposite the position where at least one coupling part 8 of said coupling parts 8 is provided on either side of the central axis of movement x of the float body 1, when the float body 1 descends to the position where this one coupling part 8 is caught on the part coupled with 8', the valve body 3 is tilted with the side of this one coupling part 8 downward, and the valve body 3 can be pulled greatly away from the valve seat 23a on this side in the initial stage of descent of the float body 1. By this, the valve seat 23a can be opened with good response and the fuel tank T can be put in a state capable of venting to the outside at the same time as the fuel flows out from the receiving chamber 20 (FIG. 6). Also, when the inside of the fuel tank T is under high pressure, a condition in which the valve body 3 is pushed against the valve seat 23a and it is difficult to unseat may arise, but even in such case the valve body 3 is tilted by the descent of the float body 1 and the valve seat 23a can be opened smoothly.

Figure 15:
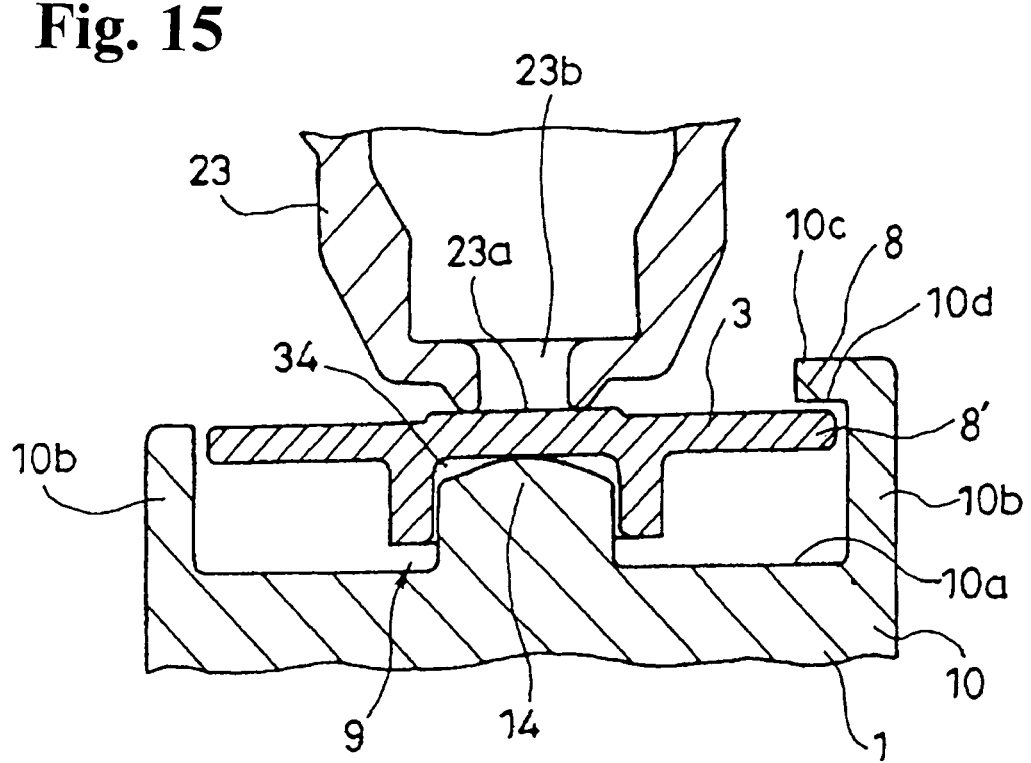
FIG. 15 is a sectional structural drawing of the essential parts of an example partially changing the configurations of both the valve body and the float body.
Figure 16:
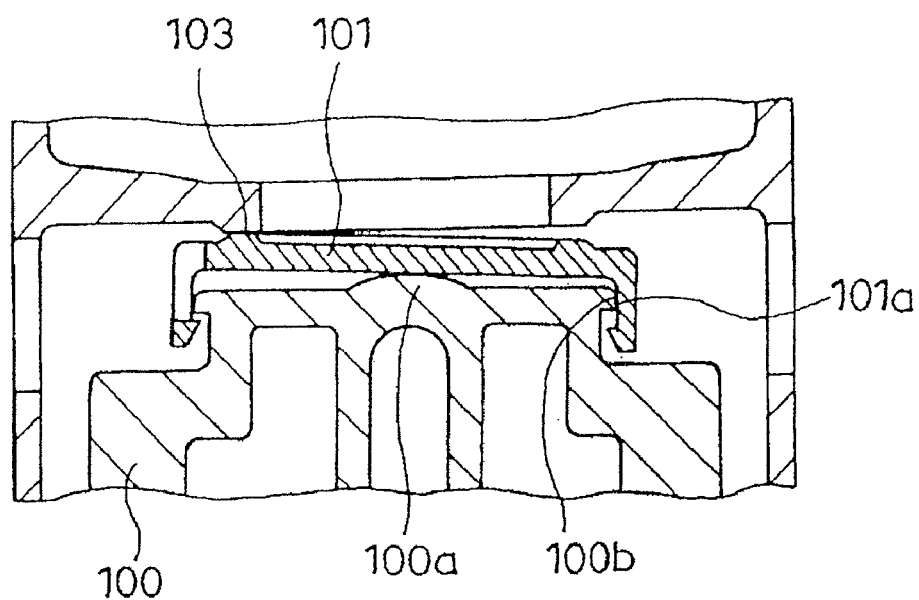
FIG. 16 is a sectional structural drawing showing the inconvenience of the conventional example.

As shown in FIG. 15, it can be made to exhibit the same kind of function even if it is made such that plural protruding pieces 10b protruding upward to receive the valve body 3 inside are provided on the upper end part of the float body 1, and a coupling claw 10c as the coupling part 8 with the coupling surface 10d facing downward is formed on some of these plural protruding pieces 10b, and this coupling claw 10c is caught from above on the edge part of the valve body 3 as the part coupled with 8', such that the valve body 3 and the float body 1 are combined in a state allowing upward and downward movements of the valve body 3 by such plural protruding pieces 10b. In this case, said leg parts 30 are not formed on the valve body 3.

Also, in this mode of working, the valve body 3 has coupling parts 8 in at least three places, which are constituted by coupling claws 31 provided on the lower ends of leg parts 30 projecting downward from the valve body 3, and the coupling claw 31 of a coupling part 8 in one place among the coupling parts 8 in three places serves as a first-striking coupling claw 31' positioned upward from the coupling claws 31 of the other coupling parts 8.

Also, it is made such that a coupling part 8 is not provided on a side opposite the central axis of movement x of the float body 1 relative to a position where the coupling part 8 serving as this first-striking coupling claw 31' is provided.

The pitch between the coupling surface 31a of the first-striking coupling claw 31' and the lower surface 32 of the valve body 3 is larger than the vertical dimension of the head part 11, and it is smaller than the pitch between the coupling surfaces 31a of the rest of the coupling claws 31 and the lower surface 32 of the valve body 3. In the illustrated example, the leg parts 30 adjacent to the leg part 30 having the first-striking coupling claw 31' in the circumferential direction of the valve body 3 respectively become the rest of the coupling claws 31.

By this, in this mode of working, during descent of the float body 1, a force is applied to the valve body 3 seated in the valve seat 23a, causing it to tilt, by the coupling part 8 taken as the first-striking coupling claw 31', whereby unseating is accomplished smoothly, and the combined state of the valve body 3 and the float body 1 can be maintained by the rest of the coupling parts 8 having coupling claws 31.

Also, by the coupling parts 8 other than the coupling part 8 taken as such first-striking coupling claw 31', it can be made such that the valve body 3 does not tilt more than a fixed angle. As shown in FIG. 10-FIG. 12, if the coupling surface 31a of the coupling claw 31 formed on the leg part 30 adjacent to the leg part 30 having the first-striking coupling claw 31' in the circumferential direction of the valve body 3 is made as an inclined surface that inclines upward gradually as it approaches this first-striking coupling claw 31', it becomes that the valve body 3 is tilted maximally in a state having this inclined surface 31a entirely in contact with the lower surface of said head part 11 (FIG. 10).

Also, in this mode of working, a fastening leg part 33 not having a coupling claw 31 and being positioned to the side of the edge part of the head part 11 of the float body 1, is formed in a position opposite the position where the first-striking coupling claw 31' is provided on the valve body 3 on either side of the central axis of movement x of the float body 1.

Also, it is made such that the pitch between the inner surface of the fastening leg part 33 and the leading end of the coupling claw 31 of the first-striking coupling part becomes somewhat smaller than the outer diameter of the head part 11.

By this, in this mode of working, while allowing said tilting of the valve body 3, by providing the fastening leg part 33 on the side opposite the side where the first-striking coupling claw 31' is formed, it can be made such that this first-striking coupling claw 31' does not come off from the head part 11 being the part coupled with 8' of the float body 1.

Also, in this mode of working, it has a pair of guide means 9, on the side of the central axis of movement x of the float body 1, which when a tilt occurs in the valve body 3, contacts on the downward side of the tilt of this valve body 3 and corrects this tilt by ascent of the float body 1, and it is made such that the float body 1 and the valve body 3 do not contact each other in the rest of the places during ascent of the float body 1.

In this mode of working, one of such pair of guide means 9 is made as a protruding part 14 provided on the float body 1, and the other of the pair of guide means 9 is made as a recessed part 34 for receiving this protruding part 14 provided on the valve body 3.

In the illustrated example, it is made such that the shaft part 11a has a semispherical shape and the shaft part 11a projects outwardly from the upper end surface 10a, and the upper part of said shaft part 11a of the head part 11 of the float body 1 functions as such protruding part 14. Also, in the illustrated example, it is made such that an encircling protruding part 34a with the inside made as said recessed part 34 is formed in about the center on the lower surface 32 of the valve body 3. Namely, the valve body 3 has a circular plate shape with an upper part wherein the encircling protruding part 34a protrudes downwardly from the lower surface 32. The diameter of this encircling protruding part 34a is somewhat larger than the outer diameter of the upper part of the shaft part 11a, and the valve body 3 receives this shaft part 11a inside the encircling protruding part 34a, and is supported on the float body 1 with this shaft part 11a surrounded by the encircling protruding part 34a being placed in contact with the lower surface 32. Also, it is made such that in this state, the inner surface of the leg part 30 of the valve body 3 does not contact the edge part of the head part 11 of the float body 1 (in the illustrated example, the edge of the outer edge part 11e of the encircling flange part 11c), the outer surface of the encircling protruding part 34a does not contact the trough wall of said encircling trough part 11f, and the leading end of the leg part 30 does not contact the upper end surface 10a of the main body part 10 of the float body 1. The upper end of the shaft part 11a is formed in a dome-like shape, and the valve body 3 is supported on the top part of this shaft part 11a with the inner recess part 34b of the recessed part 34 in point contact.

When the float body 1 ascends by inflow of fuel into the receiving chamber 20, the valve body 3 also ascends, but when a tilt occurs in the valve body 3 at this time, because the valve body 3 contacts first on one side of the valve seat 23a (FIG. 4), the other side of the valve seat 23a is lifted up by the float body 1 with this side as a fulcrum, and the tilt of the float body 1 is corrected, and it becomes that the valve body 3 is fully seated in the valve seat 23a (FIG. 5). In this mode of working, because said guide means 9 are provided on the side of the central axis of movement x of the float body 1, when a tilt as said occurs in the valve body 3, said tilt can be corrected by making the valve body 3 and the float body 1 contact at a position near said fulcrum without increasing the frictional force. Concretely, the tilt of said valve body 3 can be corrected by making the side surface 14a of the protruding part 14 contact on the inner surface following the central axis of movement x of the float body 1 in said recessed part 34 (FIG. 4).

Figure 14:
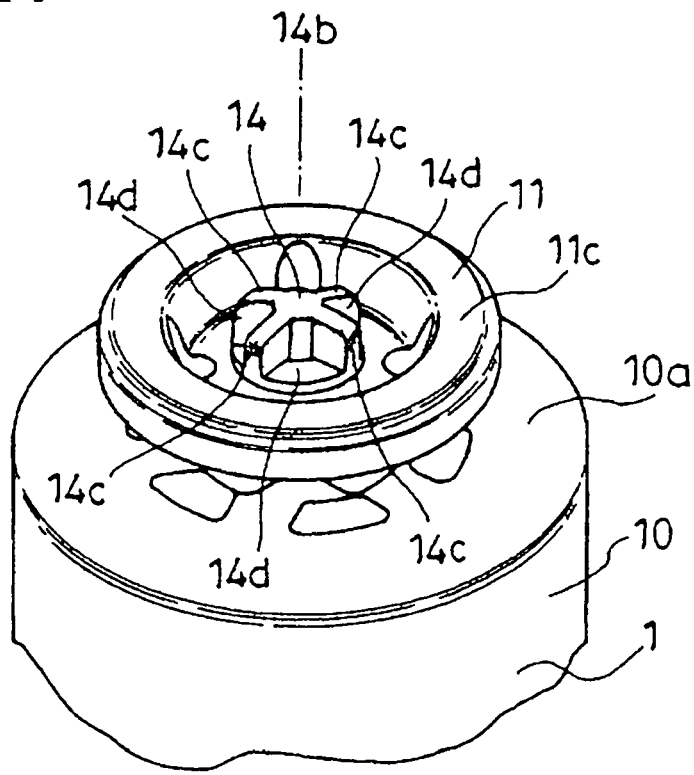
FIG. 14 is a perspective view of the essential parts of the float body pertaining to yet another configuration example.

As shown in FIG. 13 and FIG. 14, said protruding part 14 may be constituted by plural protruding part constituent bodies 14c, 14c . . . disposed surrounding the central axis of protrusion 14b of this protruding part 14 with gaps 14d between adjacent protruding part constituent bodies 14c.

Also, as shown in FIG. 11, the insides of plural recessed part constituent bodies 34c disposed in a circle with gaps 34d between adjacent recessed part constituent bodies 34c may be made as said recessed part 34.

When it is made thus, fuel remaining between the protruding part 14 and the recessed part 34 can be prevented by the gaps 14d, 34d between these constituent bodies 14c, 34c, and a situation in which the valve body 3 is made to stick to the float body 1 by remaining fuel can be prevented.

In this mode of working, also, liquid escape holes 11g are formed on the trough wall on the outer perimeter side of said encircling trough part 11f on the head part 11 of the float body 1 (FIG. 7). By these liquid escape holes 11g, it is made such that fuel entering between the protruding part 14 and the recessed part 34 does not stop in the encircling trough part 11f.

The provision of elastic deformation property to the parts that should have elastic deformation property among the various components constituting the valve device explained above is assured by constituting those components by plastic molding.

The entire contents of the Specification, Claims, Drawings, and Abstract of Japanese Patent Application 2007-117512, filed on Apr. 26, 2007, are cited and incorporated herein as a disclosure of the Specification of the present invention.

What is claimed is:

1. A valve device for a fuel tank provided in an air passage connecting an inside and an outside of the fuel tank, comprising:

a valve body having a circular plate shape and including an upper part, and an encircling protruding part protruding downwardly from the upper part, a float body having the valve body on an upper part thereof and a shaft part having a semispherical shape, projecting outward from an upper end surface of the float body and surrounded by the encircling protruding part, a receiving chamber which is formed in the air passage, said receiving chamber receiving the float body to be capable of upward and downward movements, and a valve seat which is formed in the air passage, said valve seat being closed on seating of the valve body by ascent of the float body due to inflow of fuel into the receiving chamber, wherein the valve body and the float body are engaged and combined by respectively coupling two or more coupling parts provided on one of the valve body and the float body with coupled parts provided on the other of the valve body and the float body in a state allowing the upward and downward movements of the valve body, during descent of the float body, one coupling part of the two or more coupling parts is caught first on the coupled part of the other coupling parts so that the valve body is tilted, the other coupling parts restrict tilting of the valve body, a pair of guide means is formed on a side of a central axis of movement of the float body, which when a tilt occurs in the valve body, contacts on a downward side of the tilt of the valve body and corrects the tilt by ascent of the float body, and the float body and the valve body do not contact each other, other than the guide means during ascent of the float body.

2. The valve device for the fuel tank according to claim 1, wherein one of the pair of guide means is a protruding part provided on one of the float body and the valve body, and the other of the pair of guide means is a recessed part for receiving the protruding part provided on the other of the float body and the valve body.

3. The valve device for the fuel tank according to claim 2, wherein the protruding part comprises plural protruding part constituent bodies disposed to surround a central axis of protrusion of the protruding part with gaps between adjacent protruding part constituent bodies.

4. The valve device for the fuel tank according to claim 2, wherein the recessed part is formed by insides of plural recessed part constituent bodies disposed in a circle with gaps between adjacent recessed part constituent bodies.

5. A valve device for a fuel tank provided in an air passage connecting an inside and an outside of the fuel tank, comprising:

a valve body having a circular plate shape and including an upper part, and an encircling protruding part protruding downwardly from the upper part, a float body having the valve body on an upper part thereof and a shaft part having a semispherical shape, projecting outward from an upper end surface of the float body and surrounded by the encircling protruding part, a receiving chamber which is formed in the air passage, said receiving chamber receiving the float body to be capable of upward and downward movements, and a valve seat which is formed in the air passage, said valve seat being closed on seating of the valve body by ascent of the float body due to inflow of fuel into the receiving chamber, wherein the valve body and the float body are engaged and combined by respectively coupling two or more coupling parts provided on one of the valve body and the float body with coupled parts provided on the other of the valve body and the float body in a state allowing the upward and downward movements of the valve body, a coupling part is not provided on a side opposite a position where at least one coupling part among the coupling parts is provided, relative to a central axis of movement of the float body, a pair of guide means is formed on a side of the central axis of movement of the float body, which when a tilt occurs in the valve body, contacts on a downward side of the tilt of the valve body and corrects the tilt by ascent of the float body, and the float body and the valve body do not contact each other, other than the guide means during ascent of the float body.

6. The valve device for the fuel tank according to claim 5, wherein the coupling parts comprise at least three coupling parts, which are constituted by coupling claws provided on lower ends of leg parts projecting downward from the valve body, one coupling claw of one coupling part among the coupling parts in three places serves as a first-striking coupling claw positioned upward from the coupling claws of the other coupling parts, and the coupling part is not provided on a side opposite a position where the coupling part serving as the first-striking coupling claw is provided, relative to the central axis of movement of the float body.

7. The valve device for the fuel tank according to claim 6, wherein a fastening leg part is formed in a position opposite a position where the first-striking coupling claw is provided on the valve body, relative to the central axis of movement of the float body.

8. The valve device for the fuel tank according to claim 7, wherein the valve body has a plurality of windows formed in the upper part above the coupling parts and the fastening leg part.

9. The valve device for the fuel tank according to claim 8, wherein the valve body further includes a circular flange extending downwardly from a periphery of the upper part, said plurality of coupling parts and the fastening leg part extending from the circular flange.

10. The valve device for the fuel tank according to claim 9, wherein the plurality of windows is formed circularly in the upper part with a space therebetween.

11. The valve device for the fuel tank according to claim 10, wherein the encircling protruding part is formed within an inner side of the windows.

12. The valve device for the fuel tank according to claim 11, wherein a depression is formed inside the encircling protruding part.

13. The valve device for the fuel tank according to claim 5, wherein one of the pair of guide means is a protruding part provided on one of the float body and the valve body, and the other of the pair of guide means is a recessed part for receiving the protruding part provided on the other of the float body and the valve body.

14. The valve device for the fuel tank according to claim 13, wherein the protruding part comprises plural protruding part constituent bodies disposed to surround a central axis of protrusion of the protruding part with gaps between adjacent protruding part constituent bodies.

15. The valve device for the fuel tank according to claim 13, wherein the recessed part is formed by insides of plural recessed part constituent bodies disposed in a circle with gaps between adjacent recessed part constituent bodies.

16. A valve device for a fuel tank provided in an air passage connecting an inside and an outside of the fuel tank, comprising:

a valve body having a circular plate shape and including an upper part, and an encircling protruding part protruding downwardly from the upper part, a float body having the valve body on an upper part thereof and a shaft part having a semispherical shape, projecting outward from an upper end surface of the float body and surrounded by the encircling protruding part, a receiving chamber which is formed in the air passage, said receiving chamber receiving the float body to be capable of upward and downward movements, and a valve seat which is formed in the air passage, said valve seat being closed on seating of the valve body by ascent of the float body due to inflow of fuel into the receiving chamber, wherein the valve body and the float body are engaged and combined by respectively coupling two or more coupling parts provided on one of the valve body and the float body with coupled parts provided on the other of the valve body and the float body in a state allowing the upward and downward movements of the valve body, the coupling parts comprise at least three coupling parts, which are constituted by coupling claws provided on lower ends of leg parts projecting downward from the valve body, one coupling claw of one coupling part among the coupling parts in three places serves as a first-striking coupling claw positioned upward from the coupling claws of the other coupling parts, a coupling part is not provided on a side opposite a position where the coupling part serving as the first-striking coupling claw is provided, relative to a central axis of movement of the float body, a fastening leg part is formed in a position opposite a position where the first-striking coupling claw is provided on the valve body, relative to the central axis of movement of the float body, and the valve body has a plurality of windows formed in the upper part directly above the coupling parts and the fastening leg part.

* * * * *